3,332,932
MONOAZO PIGMENTS OF DIAZOTIZED 3-AMINO-
4-METHYLBENZAMIDE WITH NAPHTHOLS
John J. De Lucia, New Milford, N.J., and Roy A. Pizzarello, Mount Vernon, N.Y., assignors to Interchemical Corporation, New York, N.Y., a corporation of Ohio
No Drawing. Filed Aug. 14, 1964, Ser. No. 389,774
6 Claims. (Cl. 260—204)

This invention relates to monoazo pigments and textiles decorated therewith. More particularly, the invention relates to certain pigments made by coupling diazotized 3-amino-4-methyl benzamide with certain Naphthol AS type coupling components, especially Naphthol AS [1-(2',3'-hydroxy-naphthoylamino) benzene],
Naphthol AS-RT [1-(2',3'-hydroxynaphthoylamino)-4-methyl benzene],
Naphthol AS-RL [1-(2',3'-hydroxynaphthoylamino)-4-methoxy benzene],
Naphthol AS-PH [1-(2',3'-hydroxynaphthoylamino)-2-ethoxy benzene],
Naphthol AS-E [1-(2',3'-hydroxynaphthoylamino)-4-chlorobenzene],
Naphthol AS-MX [1-(2',3'-hydroxynaphthoylamino)-2,4-dimethyl benzene],
Naphthol AS-KB [1-(2',3'-hydroxynaphtholyamino)-2-methyl-4-chlorobenzene],
Naphthol AS-ITR [1-(2',3'-hydroxynaphthoylamino)-2,4-dimethoxy-5-chlorobenzene], and
Naphthol AS-SW [2-(2',3'-hydroxynaphthoylamino)-naphthalene].

This application is a continuation-in-part of our copending application Ser. No. 165,929, filed Jan. 12, 1962, now abandoned, which was a continuation-in-part of copending application Ser. No. 122,425, filed July 7, 1961, now abandoned.

The art of coloring textiles with pigments is well advanced but there is a continuing search for pigments having improved properties. In recent years the desire for a bright red or scarlet pigment having good drycleaning and other properties, such as resistance to discharge agents, has increased, for instance, to print or color dress goods. At the time we started our researchers to find an improved red pigment having good drycleaning resistance one of the best red pigments for brightness and dry clean resistance was the monoazo pigment described in U.S. Patent 2,915,518 as being made by diazotizing 3-amino-4-methoxy benzanilide and coupling to 1-(2',3'-hydroxynaphtholylamino)-2,5-dimethoxy - 4 - chlorobenzene.

In our search for red pigments having improved properties for decorating textiles we have prepared numerous pigments by coupling BON (β-oxynaphthoic acid) type Naphthols with diazotized 3-aminobenzamide and its substitution derivatives. We have found that nine of these pigments, i.e. those enumerated above, have very desirable and unexpectedly good properties for pigment dyeing or pigment printing of textiles. Those pigments made by coupling diazotized 3-amino-4-methyl benzamide with Naphthol AS, Naphthol AS-RT, Naphthol AS-RL, Naphthol AS-PH, Naphthol AS-E, Naphthol AS-MX, Naphthol AS-KB, Naphthol AS-ITR and Naphthol AS-SW, when printed or pad-dyed on textile fabrics give very bright red and scarlet decorations that have unexpectedly good fastness to drycleaning while still possessing satisfactory lightfastness, washfastness, and dicharge resistance. Such decorated textile fabrics constitute a preferred embodiment of our invention.

Some of the desirable pigments referred to hereinabove are novel, namely, those made by coupling diazotized 3-amino-4-methyl benzamide with Naphthol AS-RT, Naphthol AS-RL, Naphthol AS-PH, Naphthol AS-E, Naphthol AS-MX, Naphthol AS-ITR, Naphthol AS-KB, and Naphthol AS-SW, and these new pigments constitute another preferred embodiment of our invention. These pigments are represented by the general formula

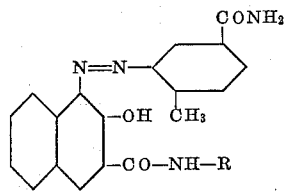

where R is a substituted aryl group selected from 4-methyl phenyl, 4-methoxy phenyl, 2-ethoxy phenyl, 4-chloro phenyl, 2,4-dimethyl phenyl, 2-methyl-4-chloro phenyl, 2,4-dimethyl-5-chlorophenyl, and 2-naphthyl.

Although the above pigments made by coupling diazotized 3-amino-4-methyl benzamide with Naphthol AS is mentioned in the prior art as a pigment for rubber that is subsequently vulcanized, there is no teaching or suggestion of its use to make the decorated textiles claimed in the present invention. Further, other prior art mentions pigments that have seemingly similar chemical structures to the presently claimed pigment but these seemingly similar pigments do not suggest or make it possible to predict the desirable properties of the pigments claimed in the present application. Our new pigments, when applied to textiles, appear to exhibit much better drycleaning resistance and discharge resistance than do the prior art pigments of closest similarity.

The following examples in which the parts are by weight will further illustrate the invention.

Example 1

150 parts of 3-amino-4-methyl benzamide, suspended in 1500 parts of water is diazotized in the usual manner with 265 parts of concentrated hydrochloric acid and 72 parts of sodium nitrite. To the cold diazo buffered with 161 parts of acetic acid and 65 parts of sodium acetate there is added with good stirring the solution made from 298 parts of 1-(2',3'-hydroxynaphthoylamino)-4-chlorobenzene (Naphthol AS-E), 1500 parts of hot water and 127 parts of caustic soda. After stirring for some time the pigment slurry is heated between 70° C. and 95° C. and filtered. An exceptionally bright scarlet pigment is obtained having good drycleaning and discharge resistance, and good light fastness when pad-dyed or printed on textiles.

The above pigment can be easily incorporated into conventional textile decorating vehicles such as those described in United States Patents 2,222,581; 2,222,582; 2,267,620; 2,364,692; 2,533,270; 2,539,914; 2,540,048; 2,600,890; 2,691,005; 2,865,871 and 2,897,165. When the pigment is to be incorporated into a water-immiscible vehicle it is easily flushed from the aqueous pulp or presscake into the desired vehicle by conventional pigment flushing technique. This technique can be used to produce commercial color concentrate dispersions, containing a minimum of water, and containing as essential components, pigment, thermosetting resin, dispersing agent and volatile solvents.

When the above pigment is incorporated into water-in-oil emulsion print pastes or oil-in-water emulsion print pastes and printed on cotton cloth it gives scarlet prints of excellent brightness, very good drycleaning resistance (AATTC Color fastness to Dry Cleaning Test Method 85–1960), good lightfastness and good discharge resistance. Good discharge resistance means that the pigment is substantially unaffected by reducing agents used in discharge printing on previously dyed fabrics. Such discharge

Example 2

In a manner similar to Example 1, the diazonium salt of 3-amino-4-methyl benzamide was coupled with 1-(2',3'-hydroxy-naphthoylamino) - 4 - methoxybenzene to give a scarlet pigment having the formula

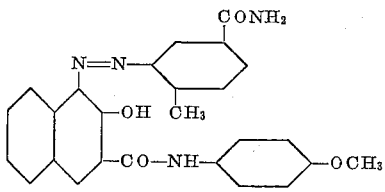

The pigment can be easily incorporated into conventional textile decorating vehicles to give bright red, or scarlet, prints and dyeings on textiles having good drycleaning resistance, lightfastness and discharge resistance. Like the pigment of Example 1, the above pigment is easily flushed from the aqueous pulp into water-immiscible vehicles. Prints on cotton cloth were very bright, and good fastness to drycleaning and to light, and had good discharge resistance.

Example 3

In a manner similar to Example 1, the diazonium salt of 3-amino-4-methyl benzamide was coupled with 1-(2',3'-hydroxy - naphthoylamino) - 4 - methyl benzene to give a scarlet pigment having the formula

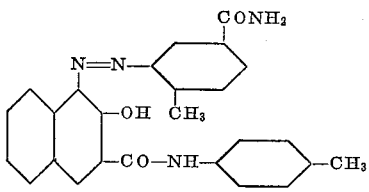

The pigment can be easily incorporated into conventional textile decorating vehicles to give bright red, or scarlet, prints and dyeings on textiles having good drycleaning resistance, light fastness and discharge resistance. Like the pigment of Example 1, the above pigment is easily flushed from the aqueous pulp into water-immiscible vehicles. Prints on cotton cloth were very bright, had good fastness to drycleaning and to light, and had good discharge resistance.

Example 4

In a manner similar to Example 1, the diazonium salt of 3-amino-4-methyl benzamide was coupled with 1-(2',3'-hydroxy-naphthoylamino) benzene to give a red pigment having the formula

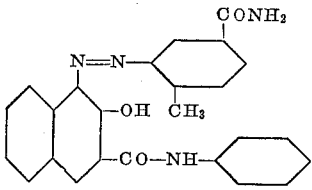

The pigment can be easily incorporated into conventional textile decorating vehicles to give bright red, or scarlet, prints and dyeings having good drycleaning resistance, lightfastness and discharge resistance. Like the pigment of Example 1, the above pigment is easily flushed from the aqueous pulp into water-immiscible vehicles. Prints on cotton cloth were very bright, and good fastness to drycleaning and to light, and had good discharge resistance.

Example 5

In a manner similar to Example 1, the diazonium salt of 3-amino-4-methyl benzamide was coupled with 1-(2',3'-hydroxy-naphthoylamino)-2-ethoxy benzene to give a scarlet pigment having the formula

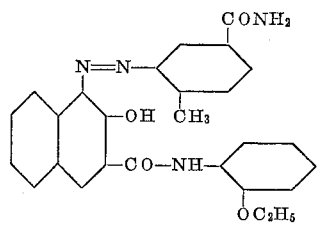

The pigment can be easily incorporated into conventional textile decorating vehicles to give bright red, or scarlet, prints and dyeings having good drycleaning resistance, light fastness and discharge resistance. Like the pigment of Example 1, the above pigment is easily flushed from the aqueous pulp into water-immiscible vehicles. Prints on cotton cloth were very bright, had good fastness to drycleaning and to light, and had good discharge resistance.

Example 6

In a manner similar to Example 1, the diazonium salt of 3-amino-4-methyl benzamide was coupled with 1-(2',3' - hydroxy - naphthoylamino) - 2,4-dimethyl benzene to give red pigment having the formula

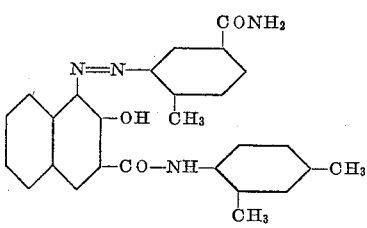

The pigment can be easily incorporated into conventional textile decorating vehicles to give bright red prints and dyeings on textiles having good drycleaning resistance, light fastness and discharge resistance. Like the pigment of Example 1, the above pigment is easily flushed from the aqueous pulp into water-immiscible vehicles. Prints on cotton cloth were very bright, and good fastness to drycleaning and to light, and had good discharge resistance.

Example 7

In a manner similar to Example 1, the diazonium salt of 3-amino-4-methyl benzamide was coupled with 1-(2',3'-hydroxy-naphthoylamino)-2-methyl-chloro benzene to give a red pigment having the formula

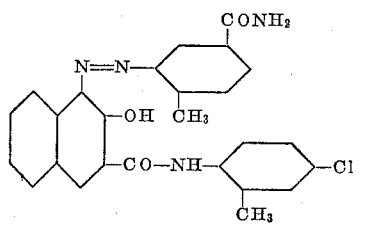

The pigment can be easily incorporated into conventional textile decorating vehicles to give bright red prints and dyeings having good drycleaning resistance, light fastness and discharge resistance. Like the pigment of Example 1, the above pigment is easily flushed from the aqueous pulp into water-immiscible vehicles. Prints on cotton cloth were very bright, had good fastness to drycleaning and to light, and had good discharge resistance.

Example 8

In a manner similar to Example 1, the diazonium salt of 3-amino-4-methyl benzamide was coupled with 1-(2', 3'-hydroxy-naphthoylamino)-2,4-dimethoxy-5-chloro benzene to give a red pigment having the formula

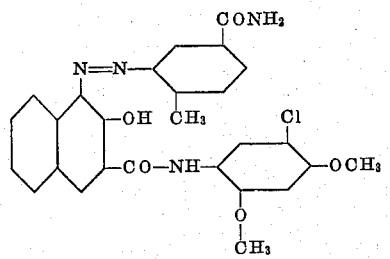

The pigment can be easily incorporated into conventional textile decorating vehicles to give bright red prints and dyeings having good drycleaning resistance, light fastness and discharge resistance. Like the pigment of Example 1, the above pigment is easily flushed from the aqueous pulp into water-immiscible vehicles. Prints on cotton cloth were very bright, and good fastness to drycleaning and to light, and had good discharge resistance.

*Example 9*

In a manner similar to Example 1, the diazonium salt of 3-amino-4-methyl benzamide was coupled with 1-(2',3'-hydroxy-naphthoylamino)-2-naphthalene to give a red pigment having the formula

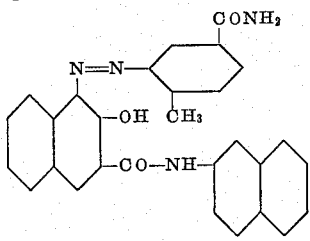

The pigment can be easily incorporated into conventional textile decorating vehicles to give bright red prints and dyeings having good drycleaning resistance, light fastness and discharge resistance. Like the pigment of Example 1, the above pigment is easily flushed from the aqueous pulp into water-immiscible vehicles. Prints on cotton cloth were very bright, had good fastness to drycleaning and to light, and had good discharge resistance.

A typical water-in-oil emulsion textile decorating composition for printing on textiles would be as follows:

| | Parts by weight |
|---|---|
| Pigment of Example 1 | 2.40 |
| Melamine-formaldehyde thermosetting resin, as 50% solution in 50/50 xylol/butanol | 2.40 |
| Ethyl cellulose, N-10 grade | .15 |
| Xylol | 2.45 |
| Octyl alcohol | 1.00 |
| Water | 53.13 |
| Solvesso 100 (aromatic hydrocarbon solvent, boiling range 160°–177° C., and Kauri-Butanol value of 93) | 9.60 |
| Varsol No. 2 | 17.60 |
| Ammonium sulfate | .07 |
| Soya oil modified glycerol phthalate alkyd of medium oil length, as 50% solution in xylol | 1.20 |
| Butadiene-acrylonitrile copolymer elastomer latex, 40% solids | 10.00 |

Prints on cotton using this print paste were very bright red, had excellent drycleaning resistance when subjected to the standard AATTC Test 85–1960, only slight fading after 20 hours exposure in the Fade-Ometer and only a trace or no color loss when subjected to a No. 3A washfastness test. Some very similar pigments, for example the pigments made by coupling the diazonium salt with Naphthol AS-RP [1-(2',3'-hydroxynaphthoyl-amino)-4-ethoxy benzene] and Naphthol AS-TR [1-(2',3'-hydroxynaphthoxyamine)-2-methyl-4-chlorobenzene], when substituted in the above formulation and printed on cotton, showed a definite though moderate color loss in the drycleaning test and considerable color loss in the washfastness test. Other similar pigments, e.g. those made according to Example 1, but using 3-amino-4-chloro benzamide instead of 3-amino-4-methyl benzamide, gave prints that showed a definite color loss in the drycleaning test; the pigment made by coupling diazotized 3-amino-4-chloro benzamide to Naphthol AS-TR gave prints that lost most of their color when subjected to the drycleaning test.

An oil-in-water emulsion textile printing composition is illustrated by the following:

| | Parts by weight |
|---|---|
| Pigment of Example 2 | 2.00 |
| Sodium lauryl sulfate | .40 |
| Ammonium sulfate | .21 |
| Methyl cellulose, 15 centipoise grade | .16 |
| Methyl cellulose, 4000 centipoise grade | .28 |
| Ammonium polyacrylate | .60 |
| Ammonia water, 28% ammonia | .20 |
| Butadiene-styrene copolymer elastomer latex, 40% solids | 2.40 |
| Melamine-formaldehyde resin, 50% solution in 50/50 xylol-butanol | 1.00 |
| Water | 52.25 |
| Varsol No. 2 (petroleum hydrocarbon solvent, kauri-butanol value 33–45 and boiling range 306–394° F.) | 30.50 |
| Butadiene-acrylonitrile copolymer elastomer latex, 40% solids | 10.00 |

This printing composition gave very bright red prints on cotton having exceptionally good drycleaning resistance in that it showed substantially no color loss when subjected to the standard AATTC Test Method 85-1960 and showed substantially no color loss when subjected to a No. 3A Wash Test. The prints showed substantially no fading after 30 hours exposure in the Fadeometer. Surprisingly, a very similar pigment chemically, i.e., the pigment made by coupling diazotized 3-amino-4-methyl benzamide to Naphthol AS-OL [1-(2',3'-hydroxynaphthoylamino)-2-methoxy benzene], showed definite color loss in the drycleaning test, withstood only 10 hours in the Fadeometer without substantial fading, and showed moderate to considerable color loss in the washfastness test. Another similar pigment chemically, i.e. the pigment from coupling the same diazonium compound to Naphthol AS-RP [1-(2',3'-hydroxynaphthoylamino)-4-ethoxybenzene] was similar to the Naphthol AS-OL coupling. Also, the pigment made by replacing the 3-amino-4-methyl benzamide of the Example 2 pigment with 3-amino-4-chlorobenzamide gave much inferior drycleaning resistant prints than the Example 2 pigment.

Each of the other pigments in Examples 3 to 9 give bright prints on cotton when substituted in either the above water-in-oil emulsion or oil-in-water emulsion printing formulations, give prints that show substantially no color loss in drycleaning test and in most cases substantially no color loss in the 3A Wash Test. Also, most of these pigments withstand at least 20 hours in the Fadeometer without fading.

The pigments can also be applied to textiles by the pad-dyeing process. A suitable formulation is as follows:

| | Parts by weight |
|---|---|
| Pigment (Examples 1 to 9) | .20 |
| Non-ionic surfactant, e.g. Igepal CA (an ethylene oxide fatty acid condensation product) | .11 |
| Sodium alginate | .05 |
| Diammonium phosphate | .18 |
| Acrylic copolymer, as 38% latex (78 parts 2-ethyl hexyl acrylate, 20 parts acrylonitrile and 2 parts itaconic acid) | .30 |
| Water | 99.16 |

While the invention has been described with particular reference to the decoration of cotton fabrics, it is to be understood that the invention is not limited to the decoration of any particular fabric. The invention is applicable to the decoration of textile fabrics in general.

We claim:

1. Azo pigments having the formula

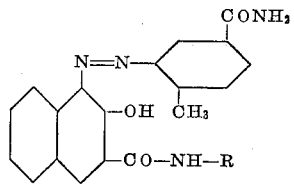

where R is a substituted aryl group selected from 4-methyl phenyl, 4-methoxy phenyl, 2-ethoxy phenyl, 4-chloro phenyl, 2,4-dimethyl phenyl, 2-methyl-4-chloro phenyl, 2,4-dimethyl-5-chloro phenyl, and 2-naphthyl.

2. An azo pigment as defined in claim 1 where R is the 4-methoxy phenyl group.

3. An azo pigment as defined in claim 1 where R is the 4-methyl phenyl group.

4. An azo pigment as defined in claim 1 where R is the 2-ethoxy phenyl group.

5. An azo pigment as defined in claim 1 where R is the 4-chloro phenyl group.

6. An azo pigment as defined in claim 1 where R is the 2,4-dimethoxy-5-chloro phenyl group.

References Cited

UNITED STATES PATENTS

| | | | |
|---|---|---|---|
| 2,006,211 | 6/1935 | Fischer | 260—203 XR |
| 2,030,896 | 2/1936 | Renshaw et al. | 260—206 |
| 2,123,634 | 7/1938 | Mietzsch et al. | 260—153 XR |
| 2,167,142 | 7/1939 | Zwilgmeyer et al. | 260—204 |
| 2,742,459 | 4/1956 | Fischer | 260—204 |
| 2,899,421 | 8/1959 | Fischer | 260—204 |
| 3,086,004 | 4/1963 | Gross et al. | 260—204 XR |
| 3,125,402 | 3/1964 | Kruckenberg et al. | 8—41 |
| 3,148,935 | 8/1964 | Pfitzner et al. | 8—41 |

FOREIGN PATENTS

| | | |
|---|---|---|
| 921,592 | 12/1954 | Germany. |

CHARLES B. PARKER, *Primary Examiner.*

F. D. HIGEL, *Assistant Examiner.*

UNITED STATES PATENT OFFICE
CERTIFICATE OF CORRECTION

Patent No. 3,332,932                              July 25, 1967

John J. De Lucia et al.

It is certified that error appears in the above identified patent and that said Letters Patent are hereby corrected as shown below:

Column 1, line 45, "researchers" should read -- researches --. Column 2, line 18, "dimethyl" should read -- dimethoxy --. Column 5, line 74, "naphthoxyamine" should read -- naphthoylamino --. Column 7, line 17, "dimethyl" should read -- dimethoxy --.

Signed and sealed this 8th day of December 1970.

(SEAL)
Attest:

Edward M. Fletcher, Jr.                      WILLIAM E. SCHUYLER, JR.
Attesting Officer                               Commissioner of Patents